(12) United States Patent
Yang et al.

(10) Patent No.: US 10,036,560 B2
(45) Date of Patent: Jul. 31, 2018

(54) HEATING PANELS AND SYSTEMS AND METHODS OF USING SAME

(71) Applicants: UNIVERSITY OF ALASKA ANCHORAGE, Anchorage, AK (US); UNIVERSITY OF HOUSTON SYSTEM, Houston, TX (US)

(72) Inventors: Zhaohui Yang, Anchorage, AK (US); Ting Yang, West Lafayette, IN (US); Gangbing Song, Pearland, TX (US); Mithun Singla, Houston, TX (US); Christiana Chang, Houston, TX (US)

(73) Assignees: University of Alaska Anchorage, Anchorage, AK (US); University of Houston System, Houston, TX (US)

( * ) Notice: Subject to any disclaimer, the term of this patent is extended or adjusted under 35 U.S.C. 154(b) by 0 days.

(21) Appl. No.: 15/809,183

(22) Filed: Nov. 10, 2017

(65) Prior Publication Data
US 2018/0087782 A1 Mar. 29, 2018

Related U.S. Application Data

(63) Continuation of application No. 14/024,152, filed on Sep. 11, 2013, now Pat. No. 9,829,202.
(Continued)

(51) Int. Cl.
*F24D 13/02* (2006.01)
*E01C 11/26* (2006.01)
(Continued)

(52) U.S. Cl.
CPC ............ *F24D 13/02* (2013.01); *E01C 11/265* (2013.01); *F24D 13/022* (2013.01);
(Continued)

(58) Field of Classification Search
CPC ... E01C 11/265; G05D 23/1934; Y02B 30/26; F24D 3/02; F24D 13/022; F24D 19/1096; F24D 2200/08
(Continued)

(56) References Cited

U.S. PATENT DOCUMENTS

| 4,418,272 | A | * | 11/1983 | Roller | ................... | H05B 3/141 |
| | | | | | | 219/505 |
| 6,825,444 | B1 | * | 11/2004 | Tuan | ..................... | E01C 11/265 |
| | | | | | | 14/73 |

(Continued)

*Primary Examiner* — Michael Laflame, Jr.
(74) *Attorney, Agent, or Firm* — Ballard Spahr LLP

(57) ABSTRACT

A system and method for heating structures to either prevent the build-up of freezing precipitation or eliminate freezing precipitation on an exposed outer surface of the structures. The system includes a heating assembly integrally formed with a structure to apply thermal energy to the exposed outer surface of the structure. Optionally, the heating assembly includes heating elements formed of carbon fiber. The system optionally includes a control assembly operatively coupled to the heating assembly. The control assembly selectively powers the heating assembly and can be configured for remote operation. In use, the control assembly can be selectively activated from a remote location to power the heating assembly and heat the structure. Optionally, the structure is a concrete structure.

20 Claims, 12 Drawing Sheets

Related U.S. Application Data

(60) Provisional application No. 61/699,372, filed on Sep. 11, 2012.

(51) Int. Cl.
*F24D 19/10* (2006.01)
*H05B 3/28* (2006.01)
*H05B 3/14* (2006.01)
*G05D 23/19* (2006.01)

(52) U.S. Cl.
CPC ..... *F24D 19/1096* (2013.01); *G05D 23/1934* (2013.01); *H05B 3/145* (2013.01); *H05B 3/286* (2013.01); *F24D 2200/08* (2013.01); *H05B 2203/002* (2013.01); *H05B 2203/014* (2013.01); *H05B 2203/026* (2013.01); *Y02B 30/26* (2013.01)

(58) Field of Classification Search
USPC ....... 219/200–201, 209, 213, 520, 528, 536, 219/538, 541, 552
See application file for complete search history.

(56) References Cited

U.S. PATENT DOCUMENTS

2006/0099833 A1* 5/2006 Mann ................ B32B 17/10036
                                                             439/63
2012/0018415 A1* 1/2012 Song .................... H05B 3/0004
                                                             219/213

* cited by examiner

DEICING/ANTI-ICING EXPERIMENTS IN THE 2010-2011 WINTER SEASON

| DATE | TIME USAGE (h) | AMBIENT TEMP (°C) | WIND CHILL (°C) | AVERAGE DENSITY (kg/m³) | SNOW ACCUMULATION (NORMALIZED) (cm) | ENERGY USAGED (kW·h) | UNIT ENERGY USAGE (kW·h/m²·cm) | UNIT COST |
|---|---|---|---|---|---|---|---|---|
| 12/13/2010 | 10 | -12.98 | -15.8 | 510.58 | 21.61 | 8.53 | 0.058998 | 0.011800 |
| 12/15-16/10 | 17 | -9.57 | -18.1 | 237.18 | 20.08 | 14.45 | 0.107574 | 0.021515 |
| 12/22/2010 | 13 | -17.67 | -24.2 | 203.52 | 4.31 | 10.99 | 0.381225 | 0.076245 |
| 12/29/2010 | 6.5 | -10.52 | -11.2 | 62.94 | 3.73 | 5.54 | 0.222214 | 0.044443 |
| 01/05/2011 | 5 | -2.70 | -3.0 | 410.36 | 8.86 | 4.20 | 0.070871 | 0.014174 |
| 01/06/2011 | 7.5 | -6.96 | -7.2 | 470.14 | 12.34 | 6.32 | 0.076600 | 0.015320 |
| 01/12/2011 | 12 | -11.36 | -21.3 | 401.12 | 10.53 | 10.16 | 0.144329 | 0.028866 |
| 01/13/2011 | 13 | -14.91 | -18.1 | 465.86 | 12.82 | 11.14 | 0.129930 | 0.025986 |
| 01/20/2011 | 8 | -7.99 | -10.9 | 94.44 | 8.00 | 6.86 | 0.128188 | 0.025638 |
| 01/24/2011 | 5 | -2.79 | -5.1 | 104.91 | 4.44 | 4.24 | 0.142561 | 0.028512 |
| 01/26/2011 | 3 | -3.83 | -4.9 | 913.41 | 2.36 | 2.61 | 0.165424 | 0.033085 |
| 01/28/2011 | 4.72 | -7.58 | -11.8 | 915.57 | 2.40 | 4.03 | 0.250473 | 0.050095 |
| 02/02/2011 | 5 | 0.43 | -2.3 | 109.66 | 9.28 | 4.31 | 0.069320 | 0.013864 |
| 02/03/2011 | 4.5 | -4.71 | -7.6 | 155.21 | 7.88 | 3.89 | 0.073719 | 0.014744 |
| 02/14/2011 | 9 | -10.00 | -11.3 | 99.19 | 4.62 | 7.74 | 0.250522 | 0.050104 |
| 02/17-18/2011* | 24 | -6.67 | -6.7 | 82.64 | 15.39 | 20.69 | 0.200912 | 0.040182 |
| 03/18/2011 | 5 | 0.67 | 0.7 | 68.06 | 10.08 | 4.36 | 0.064563 | 0.012913 |
| 03/30-31/2011* | 12.5 | -1.67 | -6.0 | 40.20 | 2.64 | 10.95 | 0.619714 | 0.123943 |
| 04/05/2011* | 3 | 2.22 | 2.2 | 52.59 | 10.02 | 2.60 | 0.038727 | 0.007745 | a INDICATING ANTI-ICING TEST.
b ENERGY COST ASSUMED AT $0.2 /kW·h ON THE BASIS OF THE ACTUAL COST OF ELECTRICITY IN 2011

FIG. 15

| DEICING SYSTEM | INSTALLATION COST ($/m²) | ANNUAL OPERATING COST ($/m²) | POWER DENSITY (W/m²) | UNIT COST AT -6~-3°C AIR TEMP. ($/m²·cm) |
|---|---|---|---|---|
| ELECTRIC HEATING CABLE, 1961 (HENDERSON 1963) | $23.6/m²[b] | $2.8/m²[b] | 323-430[b] | 0.368[b] |
| HOT WATER, 1995 (CRESS 1995) | $161/m²[a] | $250/STORM[a] | 473[a] | — |
| CONDUCTIVE CONCRETE MIXING WITH STEEL SHAVING AND STEEL FIBER 1999 | $48/m²[a] | $0.8/m²/STORM[a] | 590[a] | 0.075[b] |
| CONDUCTIVE CONCRETE MIXING WITH STEEL FIBERS AND CARBON PARTICLES 2003-2007 (TUAN 2008) | $205/m²[b] | $0.74/m²/STORM[b] | 350[a] | 0.033[b] |
| CARBON FIBER HEATING WIRE 2008 (ZHAO ET AL. 2010) | N/A | $0.38 - $2.8/m²/STORM[b] | 500-800[a] | 0.025[b] |
| CARBON FIBER TAPE HEATING PANEL (DISCLOSED HEREIN) | $145/m² | $0.09/m²/STORM | 127 | 0.010 |

NOTE: ENERGY COST ASSUMED AT $0.08/kW·h FOR COMPARISON
[a] COST VALUE AND POWER DENSITY WERE QUOTED DIRECTLY FROM THE LITERATURE
[b] COST VALUE AND POWER DENSITY WERE CONVERTED INTO UNIFORM UNIT.

FIG. 19 ined with the teachings herein, and as such, subject to the invention. As used in the specification and the appended

HEATING PANELS AND SYSTEMS AND METHODS OF USING SAME

CROSS-REFERENCE TO RELATED PATENT APPLICATIONS

This application is a continuation of co-pending U.S. patent application Ser. No. 14/024,152, filed on Sep. 11, 2013, which claims the benefit of the filing date of U.S. Provisional Patent Application No. 61/699,372, filed on Sep. 11, 2012, which applications are incorporated by reference herein in their entirety.

STATEMENT OF GOVERNMENT SUPPORT

This invention was made with United States government support under Grant AUTC Project #410014 awarded by the Research and Innovative Technology Administration of the United States Department of Transportation through the Alaska University Transportation Center. The government has certain rights in this invention.

FIELD

The present invention relates generally to construction and maintenance of concrete structures that define travel surfaces, including, for example, roadways, pathways, drive-throughs, flooring, and stairways. More particularly, the present invention relates to structurally integrated, self-heating concrete systems having electrically resistive heating panels configured to heat concrete roadways, pathways, drive-throughs, flooring, and stairways for purposes of melting surface ice or snow.

BACKGROUND

In freezing climates, snow and ice can cause a number of dangerous roadway conditions that can be both hazardous and inconvenient. These dangerous road conditions can lead to an increase in traffic accidents. A number of deicing or anti-icing strategies, including mechanical, chemical, and thermal methods, have been employed to mitigate the effects of snow and ice on pavement surfaces.

The most conventional chemical deicing method is salting. Salting can be a cheap and effective method of deicing roads. However, the salt used during these deicing methods can corrode the steel in automobiles and concrete roadway structures cause additional environmental pollution. It has been shown that the use of deicing salts is associated with saline pollution in groundwater and springs in urban areas. Elevated concentrations of salt in groundwater and in roadside areas can damage vegetation and decrease aeration and availability of water in soil. It has also been shown that roadway salting can cause corrosion of steel reinforcements of roadway structures, resulting in both structural damage and a need for costly repairs. For example, degradation of bridge decks has been shown to be particularly pronounced in areas with freezing weather, most notably in the north east and along the Atlantic coast, where only approximately 75% of bridges were still in sound condition after 20 years, as compared to 80% in the Great Lakes and 88% in the lower plains. In another example, it has been estimated that between 1990 and 2000, the cost of repairing bridge decks declared to be unsound ranged between 50 and 200 million dollars a year.

To reduce damage to concrete roadway structures, certain complex chemical solutions have been developed as an alternative to salting. Such complex chemical solutions include potassium acetate, calcium magnesium acetate, calcium magnesium potassium acetate, and the like. Some of these chemical solutions do not contain chloride, and they can be configured to decompose quickly. However, acetate can reduce the durability of asphalt and concrete roadway structures. Also, such complex chemical solutions can be expensive.

Another conventional alternative to chemical deicing methods is the use of thermal technology. Depending on whether the heating source is embedded inside the roadway structure, such thermal deicing systems can be characterized as either internal or external. Internal thermal deicing systems can include hydronic systems, electric heating cable systems, carbon fiber heating wire systems, and the like. External thermal deicing systems can include microwave systems, infrared heating systems, and the like. Such thermal deicing systems can require bulky, power-hungry, and/or unreliable components to enable the heating function. Additionally, such thermal deicing methods can cost significantly more than the conventional chemical deicing methods described above.

Accordingly, a need exists for an environmentally-friendly, safe, efficient, and cost-effective deicing system capable of increasing the operational duration of roadways, particularly during weather events involving snow, ice, and the like. There is a further need for deicing systems that can be constructed using conventional techniques and that comprise a structurally integrated and automated self-heating concrete system that is comparable in cost to conventional roadway salting.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed herein is a self-heating concrete system that can overcome one or more of the foregoing or other problems in the art. The disclosed system can include a heating assembly having a plurality of spaced heating elements and a plurality of spaced electrodes. Each heating element of the plurality of spaced heating elements can have a longitudinal axis, and the longitudinal axis of each respective heating element can be substantially parallel to the longitudinal axis of each other heating element of the plurality of heating elements. At least one electrode of the plurality of spaced electrodes can be electrically coupled to each respective heating element. The heating assembly can be configured to be integrally formed within a concrete structure to apply thermal energy to a top surface of the concrete structure. Following formation of the concrete structure, the plurality of heating elements and the plurality of spaced electrodes can be configured for unified movement with the concrete structure. Optionally, the heating elements can be formed from carbon fiber tape.

The heating system can further include a control assembly operatively coupled to the heating assembly. The control assembly can be configured to selectively power the heating assembly. Optionally, the control assembly can be configured for remote operation.

Also disclosed are methods for controlling the self-heating concrete system. The methods can include integrally forming the heating assembly within the concrete structure. The methods can further include operatively coupling the control assembly to the heating assembly. The methods can still further include selectively activating the control assembly from a remote location to power the heating assembly and heat the concrete structure.

BRIEF DESCRIPTION OF THE DRAWINGS

These and other features of the preferred embodiments of the invention will become more apparent in the detailed description in which reference is made to the appended drawings wherein:

FIG. 15 illustrates exemplary conditions for deicing and/or anti-icing operation of a heating system as disclosed herein.

FIG. 19 is a table showing the cost comparison of an exemplary heating system as disclosed herein versus other thermal deicing systems.

DETAILED DESCRIPTION

Figure 1:
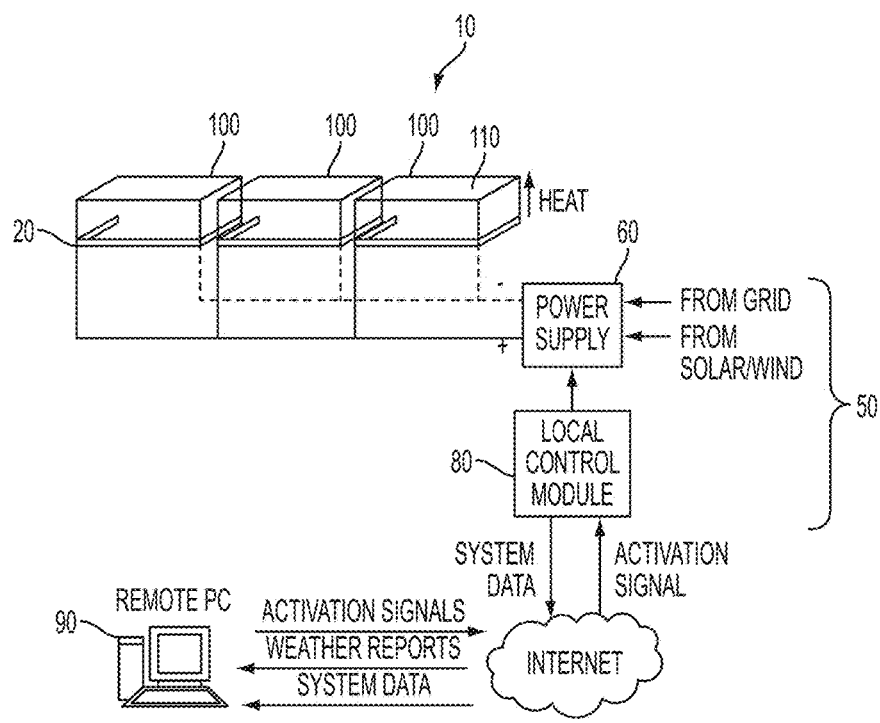
FIG. 1 schematically depicts an exemplary heating system for heating a concrete structure as disclosed herein.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "an electrode" can include two or more such electrodes unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

Disclosed herein are systems and methods for heating a concrete structure, such as, for example and without limitation, a concrete roadway structure, a concrete stairway, a concrete drive-through, a concrete flooring structure, a concrete sidewalk structure, and a concrete pathway structure. In exemplary aspects, the disclosed systems and methods can be used to electrically de-ice a concrete structure in an automated manner. It is contemplated that the disclosed systems and methods can promote conservation of the environment while also preserving the integrity of concrete structures. It is further contemplated that the disclosed systems and methods can simplify the process of regaining operability of travel surfaces, such as roadways, pathways, sidewalks, and stairways, following frozen precipitation and/or icing. It is still further contemplated that the disclosed systems and methods can also reduce labor and equipment costs.

Figure 7:
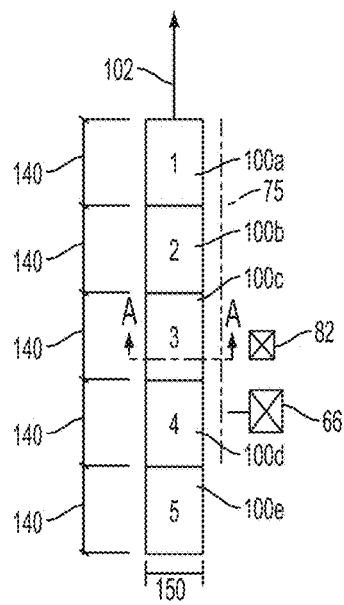
FIG. 7 illustrates a top view of an exemplary configuration of a series of concrete structures integrally formed with heating systems as disclosed herein.
Figure 8:
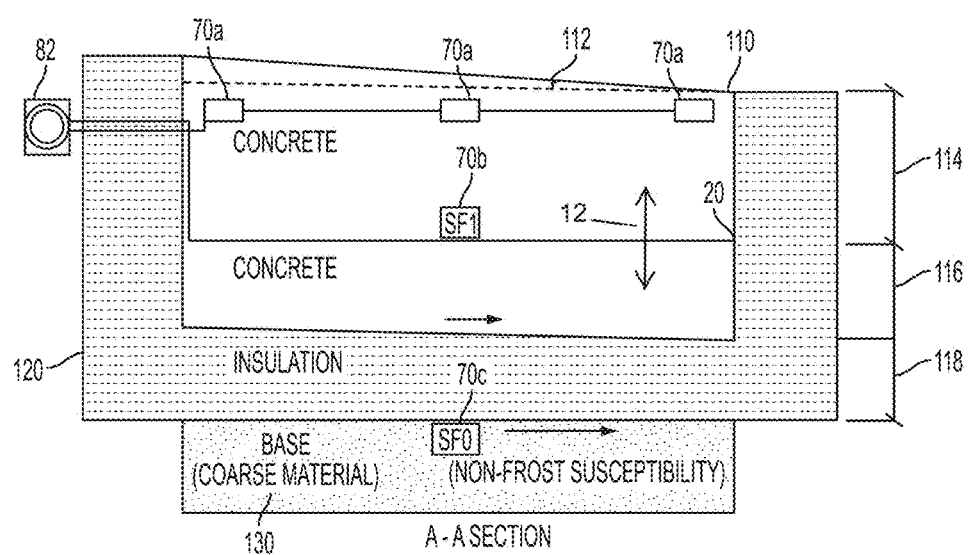
FIG. 8 illustrates a cross-sectional view of a concrete structure having an integrated flexible heating assembly as disclosed herein, taken at line A-A.

In various aspects, and with reference to FIGS. 1-10, a heating system 10 for heating a concrete structure 100 is provided. As shown in FIG. 8, it is contemplated that the concrete structure can have a top (or other outer) surface 110, at least one insulation layer 120, and a base layer 130. In exemplary aspects, the heating system 10 can comprise a heating assembly 20 and a control assembly 50.

In exemplary aspects, the heating assembly 20 can comprise heating elements formed of carbon fiber tape and/or carbon fiber fabric and a thin layer of insulating coating. In other exemplary aspects, the heating elements of the heating assembly can be positioned in a selected configuration to optimize power generation and performance for a particular application. In other exemplary aspects, the heating assembly can be coupled directly to a concrete structure (such as, for example and without limitation, a Portland cement or asphalt concrete structure) such that the heating assembly moves together with the concrete structure, thereby avoiding damage to the heating assembly. In still other exemplary aspects, the heating elements of the heating assembly can be anchored to the concrete structure by metal or carbon fiber strips to form electrodes that supply power to the heating assembly. In further exemplary aspects, low-voltage AC or DC power (for example, AC or DC power provided at voltages of less than about 24 V) can be used to power the heating assembly, thereby ensuring safe operation of the heating assembly. In still further exemplary aspects, the heating assembly can be remotely activated using remote control technology, thereby providing means for deicing a concrete structure from a remote location.

By remotely monitoring the weather and temperature data as disclosed herein, it is contemplated that the heating system 10 can be controlled by a small number of operators in a central location. It is contemplated that the remote-operation capabilities of the heating system 10 can reduce—and potentially eliminate—the turnaround time between inoperability and operability of a concrete structure. As further described herein, the heating system 10 can be triggered on-demand and begin working immediately; it does not need to wait for conditions to improve or labor support to arrive.

Although disclosed herein as being integrated into concrete structures, it is contemplated that the heating assembly 20 can be integrated into other structures for purposes of applying thermal energy to those structures. For example, it is contemplated that the heating assembly 20 can be integrated into a roof structure, thereby permitting application of thermal energy to one or more surfaces of the roof structure to melt accumulated ice and/or snow and/or to prevent accumulation of ice and snow.

The Structurally Integrated Heating Assembly

In one aspect, the heating assembly 20 can comprise a plurality of spaced heating elements 22. In this aspect, each heating element 22 of the plurality of spaced heating elements can have opposed first and second ends 24, 26 and a longitudinal axis 28 extending between the opposed first and second ends. In exemplary aspects, it is contemplated that the longitudinal axis 28 of each respective heating element 22 can be substantially parallel to the longitudinal axis of each other heating element of the plurality of heating elements. However, it is contemplated that any configuration in which the heating elements 22 can be powered in parallel can be used. In exemplary aspects, each heating element 22 of the plurality of heating elements can be spaced from adjacent heating elements by a selected distance 27, which can optionally be about 3 inches. In other exemplary aspects, it is contemplated that heating elements 22 of the heating assembly 20 that are positioned adjacent to the lateral edge of the heating assembly can be spaced from the lateral ends of the electrodes 30 by a selected distance 29, which optionally can be about 1.5 inches. In still other exemplary aspects, it is contemplated that the spacing between adjacent heating elements 22 can vary among the plurality of heating elements. Thus, in these aspects, the spacing between a first heating element and a second heating element adjacent to the first heating element can be different than the spacing between the second heating element and a third heating element adjacent to the second heating element. In still other exemplary aspects, it is contemplated that the longitudinal axis 28 of at least one heating element 22 can be angularly oriented relative to at least one other heating element 22 of the plurality of spaced heating elements.

Optionally, in some aspects, at least one heating element of the plurality of spaced heating elements can comprise carbon fiber. In these aspects, it is contemplated that at least one heating element of the plurality of spaced heating elements can comprise carbon fiber paper (also conventionally referred to as "carbon fiber tape" and/or "carbon fiber fabric") as is known in the art. In exemplary optional aspects, each heating element of the plurality of spaced heating elements can comprise carbon fiber. In these aspects, it is contemplated that each heating element of the plurality of spaced heating elements can optionally comprise carbon fiber paper. It is contemplated that carbon fiber is a lightweight material that can have a high tensile strength. For example, in exemplary aspects, it is contemplated that carbon fiber, as used herein, can have a Young's Modulus of about $18 \times 10^6$ psi, a tensile strength of about 170 ksi, and a density of about 0.057 pci. In other exemplary aspects, it is contemplated that carbon fiber as used herein can have an electrical resistivity ranging from about $8 \times 10^{-3}$ to about $40 \times 10^{-3}$ $\Omega$.

In exemplary aspects, as further described below, at least a portion of each heating element 22 of the plurality of spaced heating elements can optionally be coated with an electrically insulating material. In these aspects, it is contemplated that the electrically insulating material can optionally be thermally conductive. It is further contemplated that the coating of the electrically insulating material on each heating element can be a substantially thin coating. It is still further contemplated that, upon installation of the heating assembly 20 within a concrete structure 100 as further described herein, the plurality of heating elements 22 can be completely electrically sealed, thereby permitting safe usage of the heating system 10 in public areas.

Figure 3:
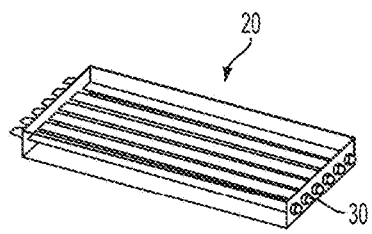
FIG. 3 illustrates an exemplary configuration of a heating assembly having metal electrodes as disclosed herein.
Figure 4:
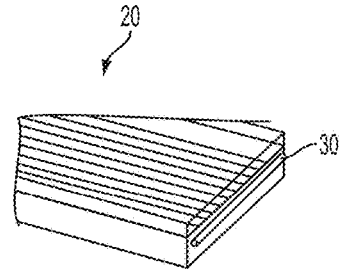
FIG. 4 discloses an exemplary configuration of a heating assembly having integrated carbon fiber electrodes as disclosed herein.

In another aspect, the heating assembly 20 can comprise a plurality of spaced electrodes 30. In this aspect, at least one electrode of the plurality of spaced electrodes 30 can be electrically coupled to each respective heating element of the plurality of spaced heating elements. It is contemplated that each electrode 30 of the plurality of spaced electrodes can have a respective longitudinal axis 32. It is further contemplated that each electrode 30 of the plurality of spaced electrodes can comprise any conventional electrically conductive material. In exemplary aspects, and as shown in FIG. 4, it is contemplated that at least one electrode 30 of the plurality of spaced electrodes can comprise carbon fiber. In these aspects, it is further contemplated that each electrode 30 of the plurality of spaced electrodes can comprise carbon fiber. In other exemplary aspects, and as shown in FIG. 3, it is contemplated that at least one electrode 30 of the plurality of spaced electrodes can comprise metal. In these aspects, it is further contemplated that each electrode 30 of the plurality of spaced electrodes can comprise metal.

In a further aspect, it is contemplated that the heating assembly 20 can be configured to be integrally formed within the concrete structure 100 to apply thermal energy to the top surface 110 of the concrete structure. In this aspect, it is contemplated that the top surface 110 can optionally be a substantially flat surface. However, it is also contemplated that the top surface 110 can optionally be a substantially curved surface. It is further contemplated that, following formation of the concrete structure 100, the plurality of heating elements 22 and the plurality of electrodes 30 can be configured for unified movement with the concrete structure 100. As used herein, the term "unified" refers to the contemporaneous movement of the heating assembly 20 and the concrete structure 100 in response to a force applied to the concrete structure. Such "unified" movement results from the integral formation of the heating assembly 20 with the concrete structure 100 and is characterized by an arrangement in which the translational and/or bending movement of the heating assembly corresponds to the translational and/or bending movement of surrounding portions of the concrete structure. Thus, as a portion of the concrete structure translates in a first direction, the adjacent portions of the heating assembly 20 will likewise translate in the first direction. Similarly, when a portion of the concrete structure undergoes bending movement, portions of the heating assembly 20 adjacent to the bending locations (within the concrete structure) will undergo corresponding bending movement.

Figure 9:
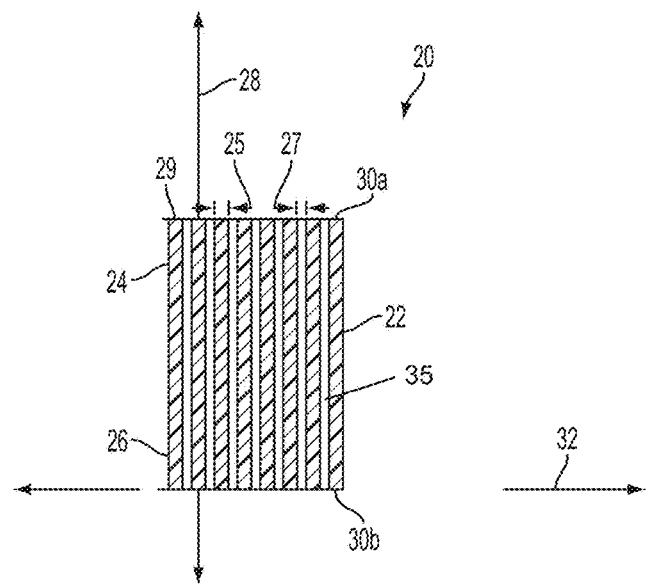
FIG. 9 illustrates an isolated top view of an exemplary heating assembly as disclosed herein.

In additional aspects, as shown in FIGS. 3, 4, and 9, the plurality of spaced electrodes 30 can comprise at least one pair of opposed electrodes. In these aspects, each pair of opposed electrodes can comprise a first electrode 30a coupled to the first end 24 of at least one spaced heating element 22 and a second electrode 30b coupled to the second end 26 of at least one spaced heating element.

Figure 2A:
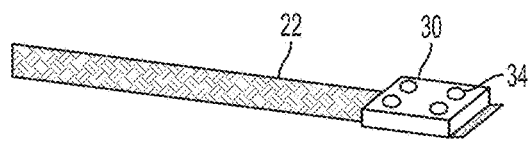
FIGS. 2A and 2B illustrate exemplary anchor portions of an electrode of a heating assembly as disclosed herein.

In exemplary aspects, the plurality of electrodes 30 can be configured to restrict movement of the plurality of heating elements 22, thereby maintaining electrical coupling between the electrodes and the heating elements. In some aspects, as shown in FIGS. 2-3, it is contemplated that each electrode 30 of the plurality of electrodes can optionally comprise at least one anchor element 34. In these aspects, it is further contemplated that the at least one anchor element 34 can comprise at least one fastener that extends through at least a portion of an adjacent heating element 22, thereby securing a heating element 22 to a respective electrode 30. In one exemplary aspect, at least one electrode 30 of the plurality of electrodes can comprise a pair of spaced bars 33 that define a central space for receiving a portion of each heating element 22 of the plurality of heating elements. In this aspect, it is contemplated that the spaced bars 33 can be configured to "sandwich" the plurality of heating elements 22 between the two bars, and the anchor elements 34 can secure the heating elements 22 in this operative position. Optionally, it is contemplated that the bars 33 can comprise copper bars and the heating elements 22 can comprise carbon fiber tape.

In other aspects, as shown in FIG. 4, each electrode 30 of the plurality of electrodes can be provided as an elongate structure having a substantially round cross-section. In these aspects, it is contemplated that the plurality of electrodes 30 can be configured to act as anchors to secure the respective ends of the heating elements in a desired location.

Optionally, in another aspect, each heating element 22 of the plurality of heating elements can comprise a plurality of electrical wires. In this aspect, it is contemplated that the plurality of electrical wires can comprise at least one electrical wire operatively secured to the first end 24 of the heating element 22 and at least one electrical wire operatively secured to the second end 26 of the heating element.

Figure 2B:
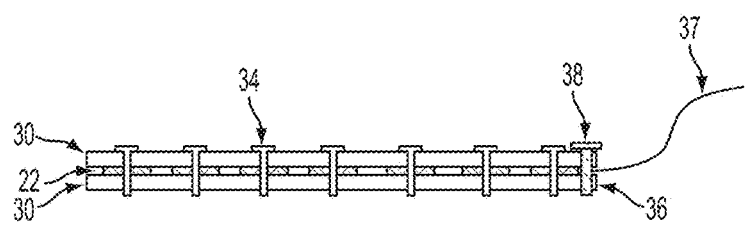

It is further contemplated that the plurality of electrical wires of each heating element 22 can be configured to electrically couple the heating element to the plurality of electrodes 30. It is still further contemplated that the plurality of electrical wires can be secured to respective ends 24, 26 of each heating element 22 using conventional methods, such as, for example and without limitation, bolting, as shown in FIG. 2B. In exemplary aspects, it is contemplated that anchor elements 34 of each respective electrode 30 can be configured for operative coupling with the plurality of wires, thereby forming an operative electrical connection between the respective heating elements 22 and electrodes 30.

Figure 5:
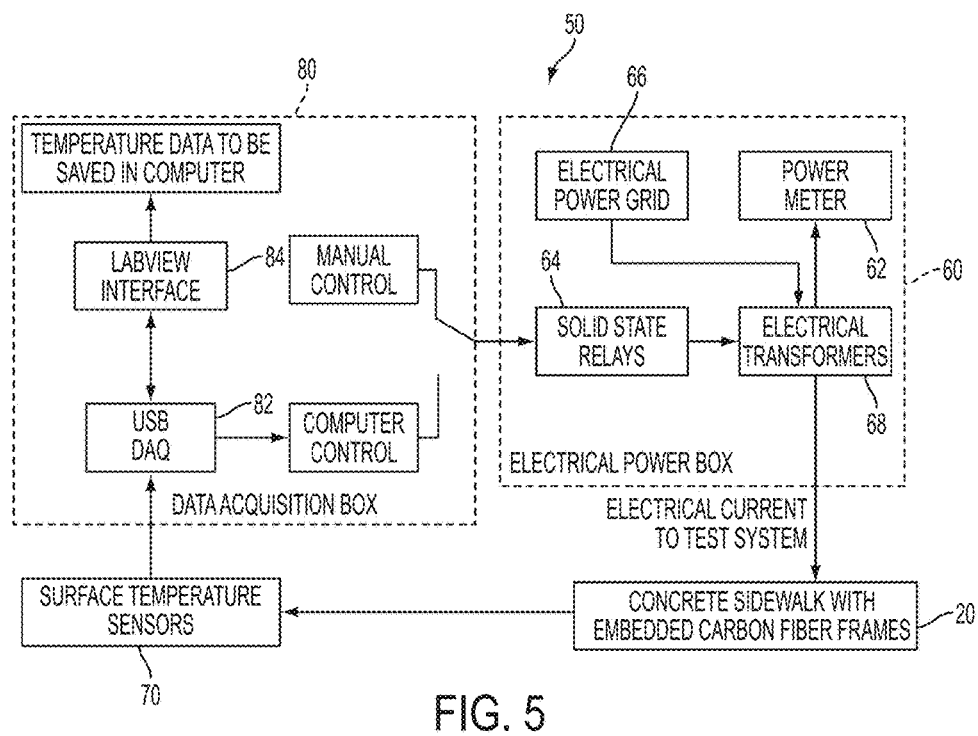
FIG. 5 is a block diagram of an exemplary heating system as disclosed herein.
Figure 6:
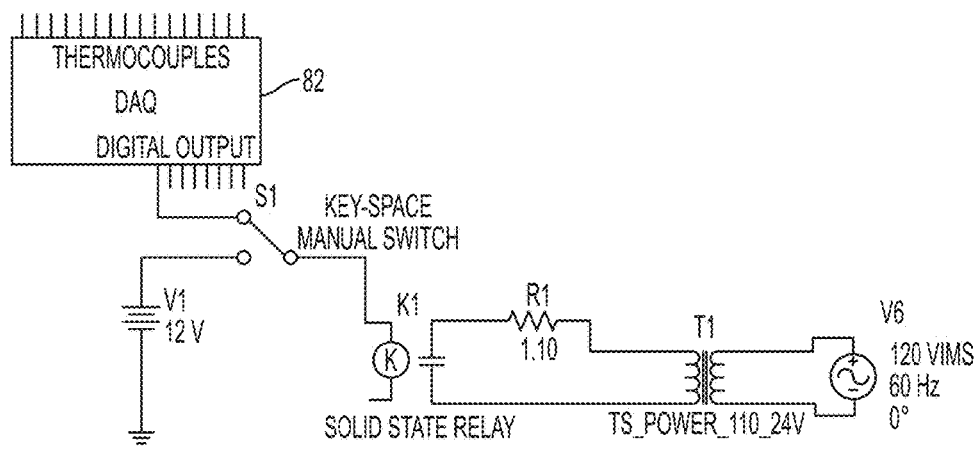
FIG. 6 is a circuit diagram of an exemplary control assembly as disclosed herein.

In exemplary aspects, and with reference to FIGS. 2B and 5, the plurality of electrical wires can be connected to an electrical power source 60 through a conventional wire connector 36. In these aspects, it is contemplated that the wire connector 36 can electrically connect electrical wires with additional electrical wiring 37 that is in electrical communication with the power source 60. In a further aspect, it is contemplated that the system 10 can be provided with an anchoring bolt 38 configured to secure the wire connector 36 to at least one electrode 30 of the plurality of electrodes.

In yet another optional aspect, the plurality of electrodes 30 can be electrically coupled to the plurality of heating elements 22 such that the longitudinal axis 32 of each respective electrode 30 is substantially parallel to the longitudinal axis 32 of each other electrode of the plurality of electrodes. In this aspect, it is contemplated that the longitudinal axes 28 of the plurality of heating elements 22 can be substantially perpendicular to the longitudinal axes 32 of the plurality of electrodes 30.

In exemplary aspects, it is contemplated that the plurality of heating elements 22 and the plurality of spaced electrodes 30 can be pre-formed into a panel structure, as shown in FIGS. 3-4 and 8-9. In these aspects, it is contemplated that the plurality of heating elements 22 and the plurality of spaced electrodes 30 can be sufficiently flexible to permit unified movement of the heating assembly 20 and the concrete structure 100. In exemplary aspects, it is contemplated that the panel structure can have any suitable shape for a particular application. For example, it is contemplated that a heating assembly 20 positioned within a stairway can be pre-formed to a shape substantially corresponding to the shape of the stairway. It is contemplated that the heating assembly 20 can be pre-formed in other non-flat configurations in order to increase flexibility of the heating assembly. However, in other exemplary aspects, it is contemplated that the heating assembly 20 can be substantially flat. In these aspects, it is contemplated that a substantially flat heating assembly 20 can be embedded within a sidewalk structure as further disclosed herein. It is contemplated that, because the heating assembly 20 is pre-formed as disclosed herein, dispersion of the heating elements 22 within the concrete structure 100 over time can be avoided or reduced.

In one exemplary aspect, it is contemplated that a heating assembly 20 can optionally be formed into a panel structure in accordance with the following method. In one aspect, the method can comprise cutting a plurality of strips of carbon fiber (for example and without limitation, carbon fiber paper) to a selected length, thereby forming the plurality of heating elements 22. In another aspect, the method can comprise arranging the plurality of strips of carbon fiber on a surface. In an additional aspect, the method can optionally comprise covering selected portions of the cut strips of carbon fiber with a layer of flexible, electrically insulating and, optionally, thermally conductive, material. In this aspect, it is contemplated that the flexible, electrically insulating and, optionally, thermally conductive material can comprise one or more conventional electrically insulating materials, such as, for example and without limitation, an epoxy and the like. It is further contemplated that the strips of carbon fiber can optionally be left substantially free of insulating material on their respective ends 24, 26 to facilitate connection to the electrodes. In a further aspect, the method can comprise connecting the strips of carbon fiber in parallel to the plurality of spaced electrodes 30 to form the panel structure. In other exemplary aspects, it is contemplated that the insulating material can be sprayed, painted or otherwise applied to coat each strip of carbon fiber and then allowed to cure.

As shown in FIGS. 8-9, the panel structure formed by the plurality of heading elements 22 (e.g., carbon fiber strips) and the plurality of spaced electrodes 30 can have a thickness extending along a vertical axis 12 that is perpendicular to the longitudinal axes 28 of the heating elements (e.g., carbon fiber strips). The spaces between adjacent heating elements 22 (e.g., carbon fiber strips) and the plurality of electrodes 30 form openings 35 that extend through the thickness of the panel structure relative to the vertical axis 12.

The Control Assembly

In other exemplary aspects, and with reference to FIGS. 1, 5-7, and 10, the control assembly 50 of the heating system 10 can be operatively coupled to the heating assembly 20. In this aspect, the control assembly 50 can be configured to selectively power the heating assembly 20. In exemplary aspects, the control assembly 50 can be configured for remote operation. Optionally, it is contemplated that at least a portion of the control assembly 50 can be disposed within the concrete structure 100. However, it is contemplated that any configuration in which the control assembly 50 is positioned in operative communication with the heating assembly 20 can be used.

In exemplary aspects, the control assembly 50 can be organized into a data acquisition box 80 and an electrical power box 60, as shown in FIG. 5. In one aspect, the electrical power box 60 can optionally comprise a power meter 62. In this aspect, it is contemplated that the power meter 62 can be configured to produce an output signal indicative of the energy consumption of—and/or the energy being applied to—the heating assembly 20. In another aspect, the electrical power box 60 can further comprise a power source 66, such as, for example and without limitation, an electrical power grid. In this aspect, it is contemplated that the power source 66 can be configured to supply electrical power to the heating assembly 20. In a further aspect, the electrical power box 60 can further comprise at least one transformer 68 that is configured to receive electrical power from the power source 66 and to, following conventional conversion of the electrical power, transmit the electrical power to the heating assembly 20. In still a further aspect, the electrical power box 60 can comprise at least one relay 64, such as, for example and without limitation, a solid state relay as is conventionally used in the art. In this aspect, the at least one relay 64 can be configured to receive one or more control signals from the data acquisition box 80 and/or a computer 90 and to transmit corresponding electrical control signals to the at least one electrical transformer 68. In exemplary aspects, each transformer 68 of the at least one transformer can be a step-down transformer. In further exemplary aspects, it is contemplated that the at least one transformer can comprise three transformers 68.

In an additional aspect, the control assembly 50 can optionally comprise at least one temperature sensor 70. In this aspect, it is contemplated that each temperature sensor 70 of the at least one temperature sensor can be positioned at a selected location relative to the concrete structure 100. It is further contemplated that each temperature sensor 70 of the at least one temperature sensor can be configured to produce an output signal indicative of the temperature of the concrete structure 100 at a respective selected location. In exemplary aspects, at least one temperature sensor 70 of the at least one temperature sensor can be coupled to the heating assembly 20.

In a further aspect, the data acquisition box 80 of the control assembly 50 can comprise a data acquisition system (DAQ) 82. In this aspect, the data acquisition system 82 can be operatively coupled to the electrical power box 60 (including, for example and without limitation, the power meter 62) and the at least one temperature sensor 70. It is contemplated that the data acquisition system 82 can be configured to receive the output signals from the power meter 62 and the at least one temperature sensor 70. In exemplary aspects, the DAQ 82 can comprise a datalogger, for example and without limitation, a CAMPBELL SCIENTIFIC CR3000 DATALOGGER® and the like. In other aspects, the data acquisition box 80 of the control assembly 50 can comprise a computer interface 84, such as, for example and without limitation, conventional data acquisition software such as LABVIEW® and the like. In these aspects, it is contemplated that the computer interface 84 can be configured to convert the output signals of the temperature sensors 70 and/or the power meter 62 into data for storage in the memory of a computer 90. In one aspect, the computer 90 can have a processor.

In exemplary aspects, and with reference to FIG. 7, it is contemplated that at least one conduit 75 can be provided to receive electrical cables, electrical wiring, or other components needed to establish electrical communication between the various components of the control assembly 50. Optionally, it is contemplated that at least a portion of each conduit 75 can be buried underneath the ground proximate the concrete structure 100 in which the heating assembly 20 is positioned. It is further contemplated that the at least one conduit 75 can be formed from any conventional insulating material.

In operation, a control signal from the data acquisition box 80 can be sent to the at least one solid state relay 64. When the at least one solid state relay 64 is activated according to pre-defined criteria, the control assembly 50 can be energized by the power source 66. In one aspect, the power meter 62 can be configured to collect data such as, but not limited to, the total energy consumption of the control assembly 50 and the like. In another aspect, the at least one transformer 68 can transform the voltage from the power source 66 to the utilization voltage of the control assembly 50. In this aspect, following transformation of the voltage, it is contemplated that the heating assembly 20, the at least one temperature sensor 70, and the data acquisition box 80 can be energized according to conventional methods.

It is contemplated that the control assembly 50 can be configured to permit monitoring of the temperature profile of at least one of the top surface 110 of the concrete surface 100 and the heating assembly 20. It is further contemplated that the data from at least one of the power meter 62 and the at least one temperature sensor 70 can be collected, analyzed, and, optionally, used in a feedback loop to control operation of the heating system 10.

Although disclosed herein as having at least one temperature sensor 70, it is further contemplated that the control assembly 50 can further comprise other conventional sensors that provide corresponding output signals to the data acquisition box 80. For example, it is contemplated that the control assembly 50 can comprise at least one humidity sensor, with each respective humidity sensor being configured to produce an output signal indicative of the humidity proximate the humidity sensor. In exemplary aspects, it is contemplated that the control assembly 50 can comprise at least one temperature sensor 70 and at least one humidity sensor, with the temperature and humidity sensors providing feedback to the data acquisition box for purposes of controlling the operation of the heating system 10 and heating assembly 20 substantially as described above with respect to the at least one temperature sensor. In operation, it is contemplated that the feedback provided by the sensors can optionally be combined with global weather forecast data to enable the control assembly 50 to make intelligent, automated decisions concerning the operation of the heating system 10 and heating assembly 20.

In exemplary aspects, it is contemplated that the power source 66 can be configured to enable resistive heating of the heating assembly 20. In these aspects, it is contemplated that, when the heating assembly 20 comprises carbon fiber heating elements 22, the heating assembly can be powered by a selected electrical power output. Optionally, it is contemplated that the selected electrical power output can range from about 0.9 to about 1.1 W.

Formation of the Concrete Layer

In further aspects illustrated in FIG. 8, the concrete structure 100 can be formed as a block unit of a concrete roadway. In one aspect, the concrete structure 100 can comprise a base layer 130, which can optionally comprise a coarse material. In this aspect, it is contemplated that the base layer 130 can be constructed from at least one fill material that is not susceptible to frost. In exemplary aspects, the base layer 130 can be constructed from sandy gravel. In another aspect, the concrete structure 100 can comprise at least one insulation layer 120. In this aspect, it is contemplated that at least one insulation layer 120 can be positioned thereon the base layer 130, as shown in FIG. 8. It is further contemplated that the at least one insulation layer can comprise an insulation layer that substantially surrounds the concrete such that only the top surface 110 of the concrete structure 100 is exposed. In exemplary aspects, the insulating layer 120 can comprise, for example and without limitation, extruded polystyrene insulation board and the like. Optionally, in one aspect, a first portion of the concrete layer can be positioned over the insulation layer 120. In this aspect, the heating assembly 20 can be positioned thereon an upper surface of the first portion of the concrete layer.

Then, the heating elements 22 of the heating assembly 20 can be electrically connected to the control assembly 50. It is contemplated that the heating assembly 20 can be configured to be powered by either an AC or a DC source. Optionally, it is contemplated that the AC or DC power source can be a low-voltage power source, thereby ensuring safe operation of the heating system 10 and eliminating the need for acquiring special permits to use the system. As further described above, in exemplary aspects, it is contemplated that the heating assembly 20 can be powered by an existing power grid 66.

In further aspects, a second portion of the concrete layer can then be formed over the heating assembly 20. Optionally, the second portion of the concrete layer can be formed by installing a reinforced steel mesh at about 1 inch above the heating assembly and pouring concrete mix over the heating assembly using standard techniques known to those skilled in the art. It is contemplated that the concrete layer can comprise at least one of, for example and without limitation, Portland concrete cement, asphalt concrete, gypsum concrete, and the like. In even further aspects, a plurality of concrete roadway block units can be positioned adjacent to each other to form a heated concrete roadway structure. Optionally, it is contemplated that the heating assembly 20 can be vertically spaced from a top surface of the insulation layer 120 by a distance 116 of about 1 inch. Optionally, it is contemplated that the insulation layer 120 can have a thickness 118 of about 2 inches.

Operation of the Heating System

In operation, the disclosed heating system 10 can be used in a method for heating a concrete structure 100. In one aspect, the method can comprise integrally forming the heating assembly with the concrete structure as disclosed herein. In another aspect, the method can comprise operatively coupling the control assembly to the heating assembly as disclosed herein. In a further aspect, the method can comprise selectively activating the control assembly from a remote location to power the heating assembly and heat the concrete structure.

In various other aspects, a method for analyzing the data collected from the data acquisition box 80 can be provided. In one aspect, this method can be implemented via an algorithm configured to analyze the data from the at least one temperature sensor 70 (and/or other conventional sensors) and control the relays 64. In further aspects, the algorithm can be configured to selectively activate and deactivate the heating assembly 20 (e.g., by applying electrical power to the heating assembly or ceasing application of electrical power to the heating assembly). In a further aspect, this method can be implemented using a LABVIEW® based control system algorithm. In one aspect, as shown in FIG. 5, a manual control can be provided. In exemplary aspects, the manual control can comprise a conventional on/off switch that can be operated manually by a user in case of an emergency or in case of malfunction of an automatic control algorithm. In another aspect, a computer-based control algorithm can be provided. In this aspect, the computer-based control algorithm can optionally be configured to power the heating assembly 20 so long as at least one measured temperature (or other measured condition) of the concrete structure 100 is less than a predetermined value. For example, in this aspect, the control algorithm can be configured to turn off the power supply once the measured temperature exceeds a predetermined temperature value. It is contemplated that the at least one measured temperature can substantially correspond to at least one of the temperature at the top surface 110 of the concrete structure 100 and at an upper surface of the heating assembly 20. In yet another aspect, the control algorithm can optionally be configured to enable weather prediction-based control. In this aspect, the control algorithm can be configured to selectively power the power source 66 based on at least one of the measured temperature (or other condition) of at least a portion of the concrete structure 100 (including, for example, the top surface 110) and a weather forecast for the area where the concrete structure is located. In exemplary aspects, it is contemplated that the weather forecast data can be retrieved through computer 90 using an Internet website and/or other database. Optionally, if the weather forecast calls for freezing rain and/or ice accumulation, it is contemplated that the control algorithm can be configured to activate the power source 66 in advance of the precipitation event such that no frozen precipitation accumulates and less power is needed to maintain the concrete structure 100 in a clear state during and, optionally after, the precipitation event.

Illustrative Examples

In one illustrative example of the present disclosure shown in FIG. 7, a concrete sidewalk comprising a plurality of self-heating carbon fiber heating panels (a plurality of heating assemblies 20) is provided. The sidewalk can be divided into a series of concrete structures 100*a*, 100*b*, 100*c*, 100*d*, 100*e*, with each concrete structure (block) having a longitudinal axis 102, a longitudinal length 140 of about 72 inches (6 feet) and a width 150 of about 48 inches (4 feet). It is contemplated that the concrete sidewalk can be about 360 inches (30 feet) long and about 48" (4') wide such that the total area of the sidewalk can be about 120 square feet.

Although exemplary dimensions of the concrete structures 100, the heating assembly 20, and the elements of the heating assembly are provided herein, it is contemplated that the dimensions of the concrete structures 100, the heating assembly, and/or the elements of the heating assembly can be selectively varied to optimize the power density (i.e., the power applied in a given area) of the heating system 10 for a particular application. For example, it is contemplated that the optimal power density for an indoor application can vary from the optimal power density for an outdoor application. Similarly, it is contemplated that the optimal power density for a floor-heating application can vary from the optimal power density for a de-icing application. Therefore, in exemplary aspects, it is contemplated that the overall length and/or width of the concrete structures 100 can be selectively varied as needed to achieve the optimal power density. In other exemplary aspects, it is contemplated that the length and/or width of each heating assembly 20 can be selectively varied as needed to achieve the optimal power density. In still other exemplary aspects, it is contemplated that the length, width, thickness, and/or spacing of the heating elements 22 and/or electrodes 30 can be selectively varied as needed to achieve the optimal power density.

In another illustrative example shown in FIG. 8, taken at section line A-A, a profile of concrete structure 100*c* comprises about 2" polystyrene foam boards disposed above the base 130 of the pavement and surrounding at least a portion of the concrete sidewalk. In a further aspect, the insulation 120 surrounds the entire concrete sidewalk. In other aspects, the carbon fiber heating panels (heating assemblies 20) can be embedded within the concrete at a depth 114 of about 4 inches. In other aspects, at least a portion of the top surface 110 of each concrete structure 100 (concrete structure 100*c*, as shown) can have a slope 112 across at least a portion of its longitudinal length. It is contemplated that the slope 112 can correspond to an incline of about 1% to allow for water drainage in a selected direction. In the present example and as shown in FIG. 7, heating assemblies can be embedded within concrete structures 100*b*, 100*c*, and 100*d*, and concrete structures 100*a* and 100*e* can be provided without heating assemblies and function as controls. In exemplary aspects, the dimensions of each heating panel 20 can be about 72 inches (long)×48 inches (wide).

As shown in FIG. 9, the heating elements 22 can have a width 25 of about 3 inches and can be placed in electrical contact with the electrodes. In one aspect, the electrodes 30 can comprise two copper strip electrodes 30*a*, 30*b* placed on each end 24, 26 of the heating elements 22 as shown in FIG. 9. In a further aspect, eight or more carbon fiber tape heating elements can be clamped between the copper strip electrodes 30*a*, 30*b* on each side of the heating panel 20. Optionally, it is contemplated that each copper strip electrode 30*a*, 30*b* can have a configuration of two spaced bars 33 as shown in FIG. 2B.

In other aspects, the plurality of heating panels 20 can be operatively connected to both an electrical power box 60 and a data acquisition box 80 as generally described above. In exemplary configurations, the electrical power box 60 can comprise a power meter 62, three step-down transformers 68 and at least one solid state relay 64. The power meter 62 can be configured to record power and energy usage of the system over a defined time period. In one aspect, the transformers 68 used can have a primary voltage of about 120/240 V, a secondary voltage of about 12/24 V, and a VA rating of about 1,000 VA. In other aspects, the transformers can be connected to a 110 V/60 Hz AC power source 66 and, in yet other aspects, the heating panels 20 can be charged with a 24 V AC power source in order to produce the desired operating temperatures.

Figure 10:
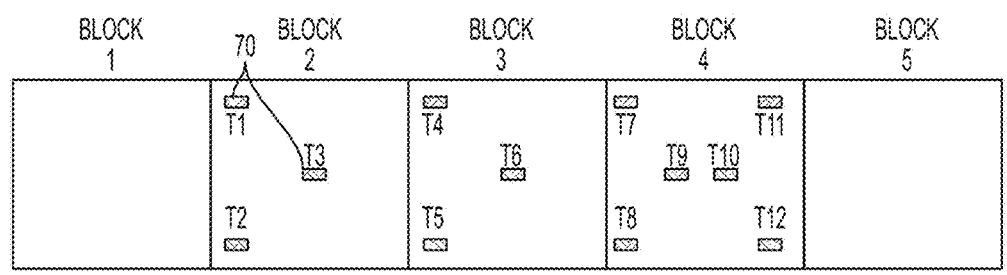
FIG. 10 illustrates an exemplary configuration of a plurality of temperature sensors on a top surface of a concrete structure as disclosed herein.

In further aspects shown in FIG. 10, the at least one temperature sensor 70 can comprise a plurality of thermocouples arranged on the surface of the concrete sidewalk. In one illustrative example, fourteen thermocouples can be arranged proximate the top surface of the concrete blocks. In a further aspect, the thermocouples can be embedded into the concrete blocks to enable monitoring of temperature changes of the respective concrete structures (blocks). In an even further aspect, at least two thermocouples 70*a* can be installed proximate the top surface 110 of the concrete structure 100, at least one thermocouple 70*b* can be installed proximate the heating assembly 20, and at least one thermocouple 70*c* can be installed proximate the base layer 130 of the concrete structure 100.

In exemplary aspects, the DAQ 82 can be configured to sample temperature data at 5 second intervals over a given operational period and, optionally, the data can be averaged to provide one temperature value for each minute of operation. In even further aspects, the control assembly 50 can be operatively connected to the internet such that a user can both monitor data and, optionally, control the deicing system from a remote location.

Figure 11:
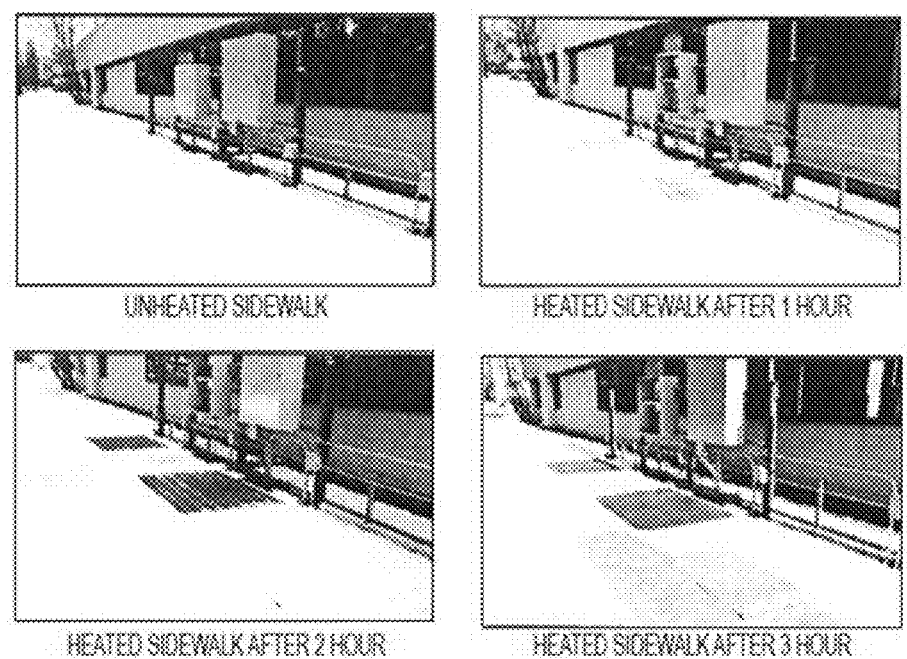
FIG. 11 displays a concrete structure equipped with a heating system as disclosed herein in the following conditions: (a) an initial, uncleared condition, (b) a first partially heated condition (after 1 hour); (c) a second partially heated condition (after 2 hours); and (d) a cleared condition (after 3 hours of heating).

In various other aspects, using the concrete sidewalk as constructed above, piles of snow were allowed to fall on the concrete sidewalk until approximately 2 inches of snow were deposited on the top surfaces of the concrete structures forming the sidewalk. The heating assembly can be connected to a transformer of, for example, 1 kVA and 24 VAC output. The transformer was allowed to heat the carbon heating element for about 3 hours for block 2 and block 4. Blocks 1, 3 and 5 were not heated in order to illustrate the efficacy of the automated electrical deicing system of the present disclosure. The accumulated snow on the surface of the heated blocks completely melted due to the heat transferred by the heating assembly to the surface of the concrete sidewalk above. FIG. 11 shows exemplary results of such a heating system, which demonstrate the efficacy of the disclosed system as an automated electrical deicing system.

Figure 12:
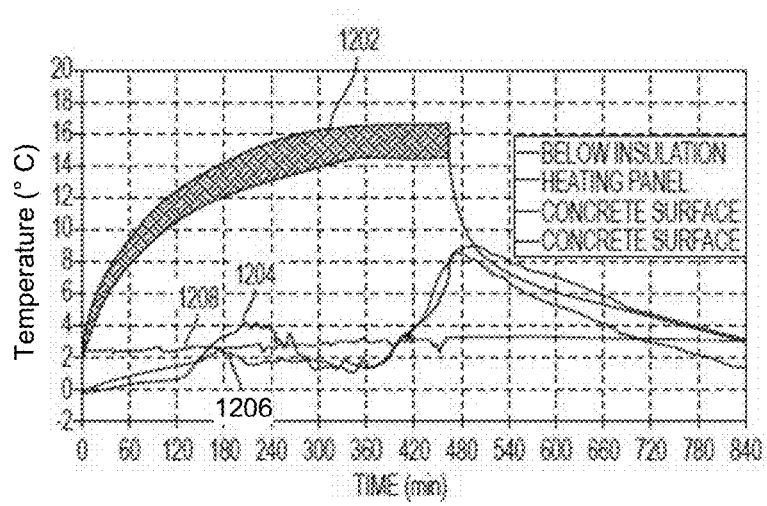
FIG. 12 is a graph showing the temperature data trended over time for one example of a heating system as disclosed herein.

In other aspects, temperature sensors 70 (e.g., thermocouples) operatively positioned on the concrete sidewalk can be used to monitor the surface temperature the sidewalk during the heating period. In one illustrative example, temperature plots are shown in FIG. 12. The data curve 1202 illustrates the temperature of the heating panel over time. The data curve 1204 and data curve 1206 illustrate the surface temperature of block 2 and block 4 over time. The data curve 1208 illustrates the soil temperature beneath the insulation over time and can be substantially constant. In other aspects, FIG. 12 also illustrates that substantially all of the heat energy can be dissipated towards the outer surface of the concrete sidewalk. In one example, data was taken for approximately 14 hours and, after 3 hours, the systems according to the present disclosure may be capable of melting the accumulated snow. In a further example, after about 8 hours, the heating of concrete blocks can be stopped manually. In other examples, it can take about 6 hours for the surface temperature of the concrete to return to the ambient temperature.

Figure 13:
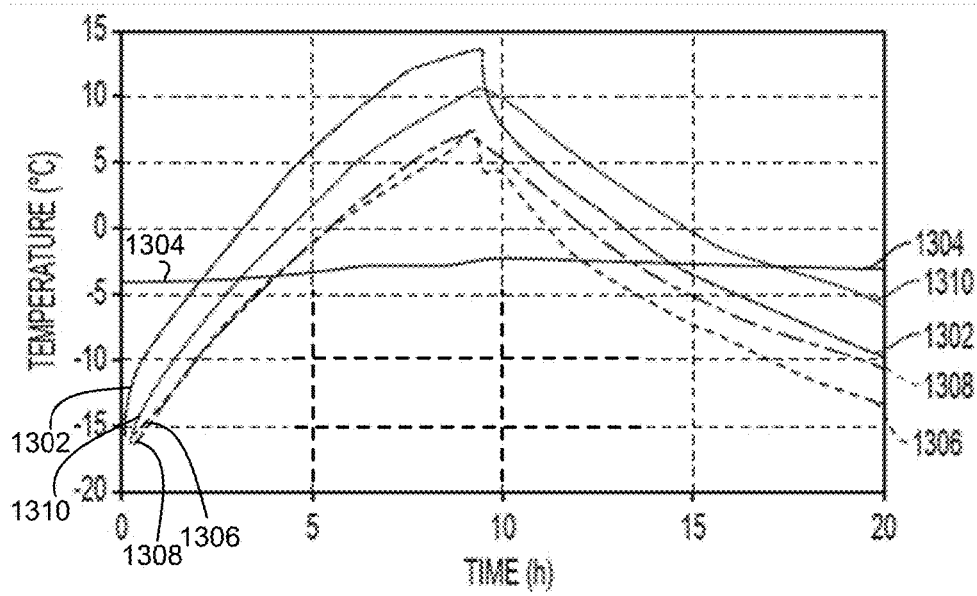
FIG. 13 illustrates temperature variation versus time for a particular location in a concrete structure integrally formed with a heating system as disclosed herein.

In another illustrative example, FIG. 13 shows the temperature variation versus time for various locations during deicing under exemplary operating conditions. Here, five thermocouples can be located as follows: on the CFT heating panel surface (Thermocouple SFI) 1302, on the base coarse material directly beneath the insulation board (Thermocouple SFO) 1304, and the lower side (Thermocouple T6) 1306, middle (Thermocouple T5) 1308, and upper side (Thermocouple T4) 1310 of the concrete surface slope. The lowest air temperature recorded during operation here can be about −9.4° F. (−23.0° C.) and occurred early in the morning. The average air temperature during operation can be about 11.5° F. (−11.4° C.), and the corresponding wind chill can be about −6.3° F. (−21.3° C.). The initial temperature of the entire sidewalk pavement can be about 4.1° F. (−15.5° C.). FIG. 13 shows that within about 4.5 h, the temperature of the lower side of the surface can rise to above snow melting point, and the time required to melt the snow can be about 7.5 h. During the test, the concrete surface temperature can peak at about 51.8° F. (11.0° C.). The temperature difference among different locations of the concrete surface can be within about 5.4° F. (3° C.), indicating that the panels are operable to heat the concrete surface quite uniformly. Without wishing to be bound by theory and/or simulation, the temperature variation of the sloped sidewalk surface may be due to the variation in the distance from the heating panel and their relative location to the carbon fiber strips in the transverse direction. During this exemplary deicing operation, the heating panel surface temperature can peak at about 57.2° F. (14° C.), and the temperature of the base coarse material below the insulation board can remain around about 24.8° F. (-4° C.), indicating that the insulation layer can work well to direct the heat towards the upper surface.

Figure 14:
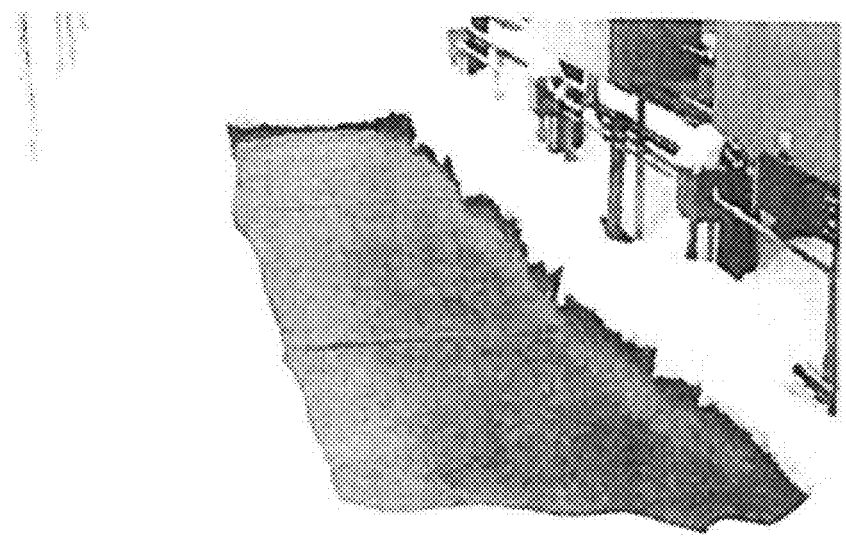
FIG. 14 illustrates the results of use of a heating system as disclosed herein to prevent ice and/or snow accumulation on the top surface of a concrete structure.

In yet other examples, the heating (deicing) system can be used to prevent the accumulation of ice or snow on the concrete surface. In this example, the deicing system was turned on about 4-5 hours prior to snowfall and the snow accumulated on surrounding outdoor surfaces measured about 152.4 mm (6 in.) over a 12-18 hour period. The deicing system can remain active for a selected time period, such as, for example, 24 hours. Under such conditions, little to no snow or ice is likely to accumulate on the heated concrete surface as illustrated in FIG. 14. The cost associated with this exemplary anti-icing operation for the three heating elements can be about 20.7 kWh, or $4.1 at $0.2/kW-h. Here, the highest temperature of the heating panel was about 79.0° F. (26.1° C.), and the concrete surface temperature reached a peak value of about 59.0° F. (15.0° C.). The average air temperature during this test was about 20.0° F. (−6.7" C).

In even further aspects, the power consumption of the system described above can be optimized by employing different control algorithms such as the LABVIEW® based control algorithms described above. Here, the automatic control system maintained the sidewalk surface temperature at a range of about +35-40° F. (+1.7-4.4° C.), during the anti-icing operation. It is contemplated that this can further reduce energy consumption of the system to about ½ to about ⅔ of what would be consumed without an automated control system.

In further aspects, it is contemplated that the heated concrete surface and deicing system can be designed such that no degradation of the system occurs over several years or decades of operation. For example, it is contemplated that the heat cycling can be controlled such that the concrete will not undergo cracking. In another example, it is contemplated that the deicing system can be configured so that no measurable change results in the electrical resistance of the heating panels. It is further contemplated that the heating panels, the power supply electrodes, and the interfaces between the electrodes and the heating panels can be stable.

During each exemplary operation, a variety of data, including snow depth, snow density, air temperature, wind chill, temperature on the test sidewalk surface, and energy consumption, were recorded as summarized in FIG. 15. The energy consumption recorded was of the three heated blocks of sidewalk, and the power density is defined as the power applied per unit of surface area. Air temperature indicates the average ambient temperature recorded during each deicing experiment at one or two readings per hour. The measured snow density from different tests varied from 40 to 510 kg/mJ because of factors such as snow accumulation time and wetness. For comparison, snow accumulation was normalized to an equivalent depth of fresh snow with a density of 60 kg/m.

Figure 16:
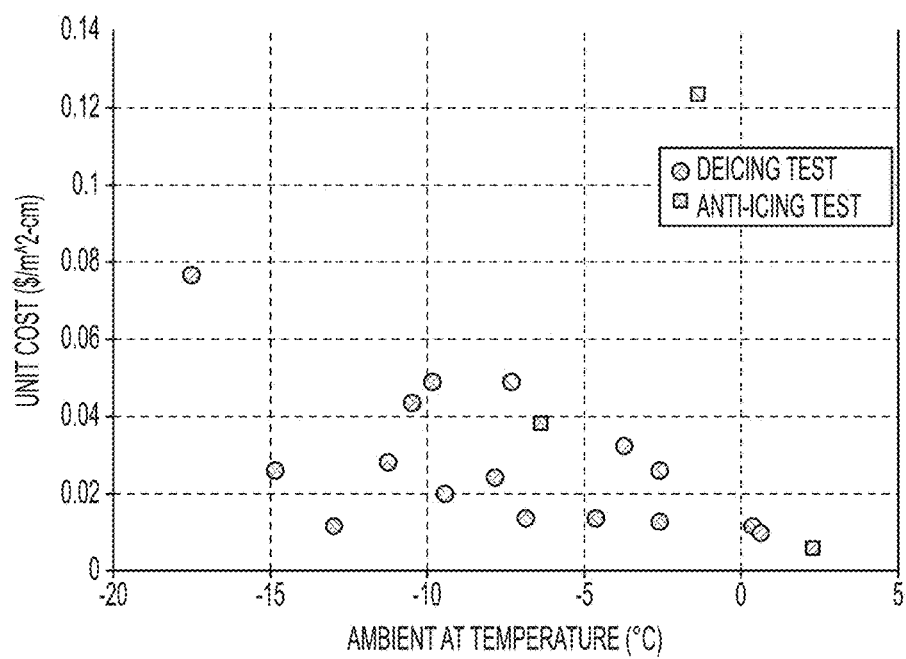
FIG. 16 illustrates ambient temperature versus deicing unit cost for an exemplary heating system as disclosed herein.
Figure 17:
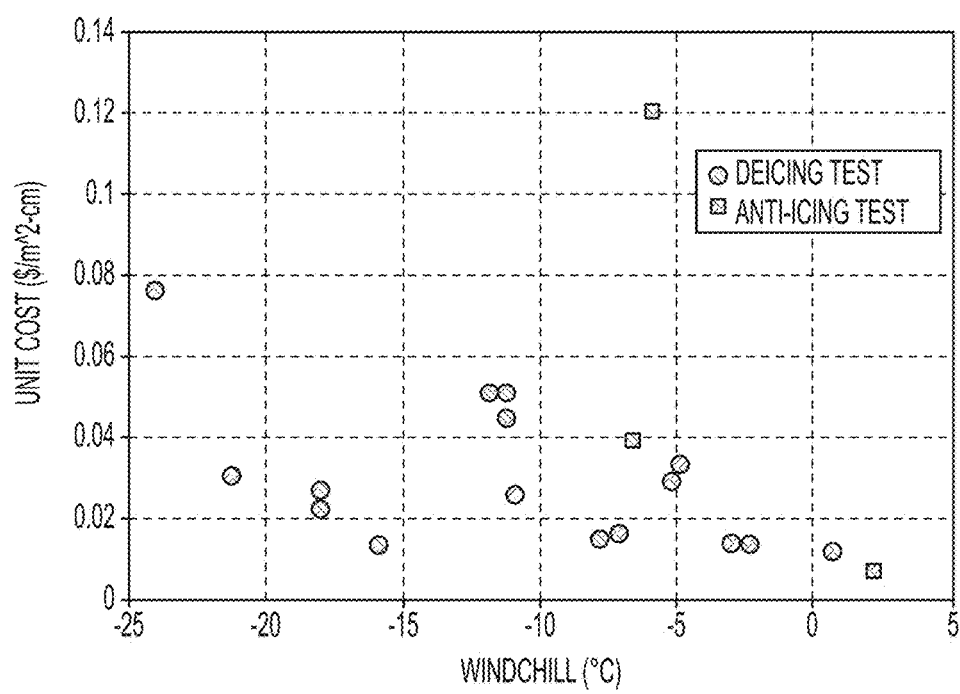
FIG. 17 illustrates wind chill versus deicing unit cost for an exemplary heating system as disclosed herein.
Figure 18:
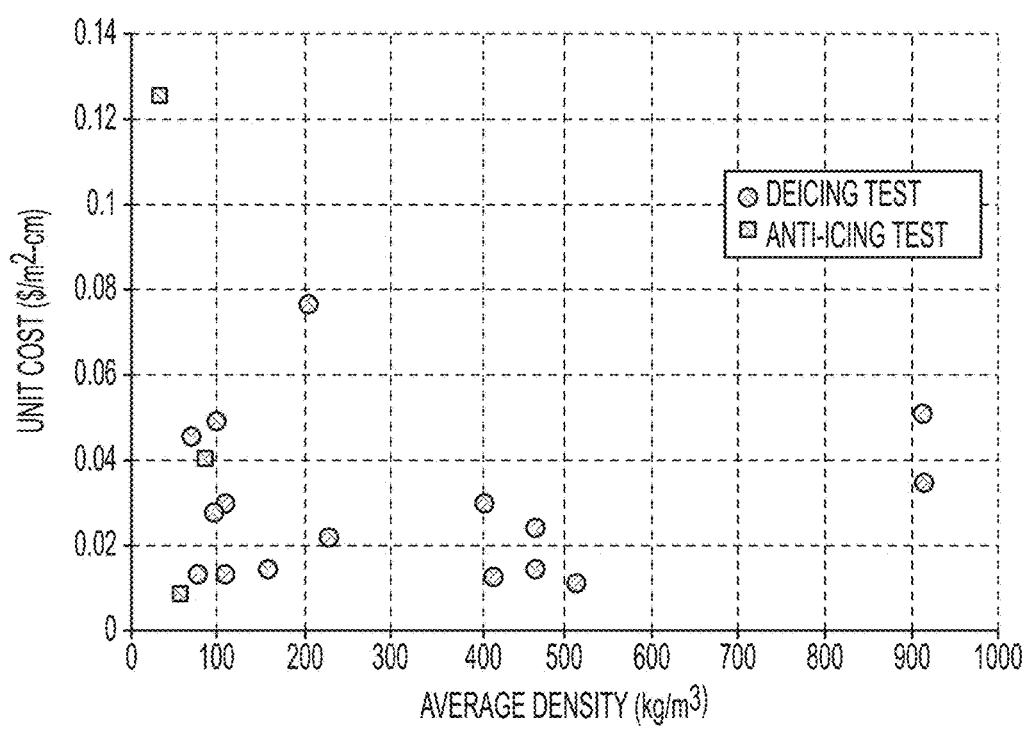
FIG. 18 illustrates snow density versus deicing unit cost for an exemplary heating system as disclosed herein.

Assuming an electricity cost of $0.2/kW-h, the recorded energy consumption was converted to energy cost, normalized by surface area and the equivalent snow accumulation, and presented as unit cost in FIG. 15. The average unit cost was $0.0292/m²-cm ($0.0069/ft²-in.) for all deicing tests and $0.0573 m²-cm ($0.0135/ft²-in.) for all anti-icing tests. Furthermore, the unit cost of deicing/ anti-icing versus ambient temperature and wind chill are presented in FIGS. 16 and 17, respectively. FIGS. 16 and 17 show that the deicing energy cost is very sensitive to ambient temperature and wind chill and generally increases as the latter two decrease. FIG. 18 depicts the unit cost of deicing/anti-icing versus snow density. As illustrated, no obvious relationship between snow density and unit cost can be observed.

Cost effectiveness can be one important factor in the applicability of a deicing system; thus, a cost comparison of deicing systems of the present disclosure with other systems that have been reported in literature was prepared. As discussed previously, the deicing cost is very sensitive to air temperature. The average unit cost for a selected air temperature range from about 21-27° F. (−6 to −3° C.) was computed for the deicing systems disclosed herein and compared with other systems known in the art in the table shown in FIG. 19.

In addition, the annual operating cost, power density, and installation cost of the disclosed deicing systems was compared with other known systems, as shown in FIG. 19. The installation cost for the disclosed system was calculated on the basis of the sum of the costs of the heating panels, electrical and control equipment, and insulation boards used in the three 1.8×1.2 m (6×4 ft) test sidewalk blocks. The labor cost and cost of the pavement materials itself were not included in this calculation. The results depicted in FIG. 19 show that the disclosed system has the lowest power density and unit cost and relatively lower installation cost among the systems compared. It is contemplated that the use of an insulation layer 1.8×1.2 m (6×4 ft), and its improved uniformity of heating coupled with its low power density, can contribute to the high efficiency of the disclosed system.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

We claim:

1. A heating panel comprising:
a plurality of carbon fiber strips, each carbon fiber strip of the plurality of carbon fiber strips being spaced apart from adjacent carbon fiber strips within the panel and having opposed first and second ends and a longitudinal axis extending between the opposed first and second ends; and
a plurality of electrodes, each electrode of the plurality of electrodes being spaced apart from other electrodes within the panel, wherein at least one electrode of the plurality of spaced electrodes is electrically coupled to each respective carbon fiber strip of the plurality of carbon fiber strips, wherein the plurality of spaced carbon fiber strips are connected to the plurality of spaced electrodes to form a panel structure, wherein the panel structure has a thickness extending along a transverse axis that is perpendicular to the longitudinal axes of the carbon fiber strips, and wherein the spaces between adjacent carbon fiber strips and the plurality of electrodes form openings that extend through the thickness of the panel structure relative to the transverse axis.

2. The heating panel of claim 1, wherein the longitudinal axis of each respective carbon fiber strip is substantially parallel to the longitudinal axis of each other carbon fiber strip of the plurality of spaced carbon fiber strips.

3. The heating panel of claim 2, wherein the plurality of spaced carbon fiber strips are connected in parallel to the plurality of spaced electrodes.

4. The heating panel of claim 1, wherein the plurality of spaced electrodes comprises at least one pair of opposed electrodes, wherein each pair of opposed electrodes comprises a first electrode coupled to the first end of at least one spaced carbon fiber strip and a second electrode coupled to the second end of at least one spaced carbon fiber strip.

5. The heating panel of claim 1, further comprising a plurality of electrical wires that are electrically coupled to the plurality of spaced electrodes.

6. The heating panel of claim 1, wherein each electrode of the plurality of spaced electrodes has a longitudinal axis, wherein the plurality of spaced electrodes are electrically coupled to the plurality of spaced carbon fiber strips such that the longitudinal axis of each respective electrode is substantially parallel to the longitudinal axis of each other electrode of the plurality of spaced electrodes.

7. The heating panel of claim 3, wherein each electrode of the plurality of spaced electrodes has a longitudinal axis, wherein the plurality of spaced electrodes are electrically coupled to the plurality of spaced carbon fiber strips such that the longitudinal axis of each respective electrode is substantially parallel to the longitudinal axis of each other electrode of the plurality of spaced electrodes, and wherein the longitudinal axes of the plurality of spaced carbon fiber strips are substantially perpendicular to the longitudinal axes of the plurality of spaced electrodes.

8. A heating system comprising:
a structure having an exposed outer surface; and
a heating panel comprising:
a plurality of carbon fiber strips, each carbon fiber strip of the plurality of carbon fiber strips being spaced apart from adjacent carbon fiber strips within the panel and having opposed first and second ends and a longitudinal axis extending between the opposed first and second ends; and
a plurality of electrodes, each electrode of the plurality of electrodes being spaced apart from other electrodes within the panel, wherein at least one electrode of the plurality of spaced electrodes is electrically coupled to each respective carbon fiber strip of the plurality of carbon fiber strips, wherein the plurality of spaced carbon fiber strips are connected to the plurality of spaced electrodes to form the heating panel, wherein the heating panel has a thickness extending along a transverse axis that is perpendicular to the longitudinal axes of the carbon fiber strips, and wherein the spaces between adjacent carbon fiber strips and the plurality of electrodes form openings that extend through the thickness of the heating panel relative to the transverse axis,
wherein the heating panel is inwardly spaced from the exposed outer surface of the structure and is configured to apply thermal energy to the exposed outer surface of the structure.

9. The heating system of claim 8, wherein the structure is a concrete structure, wherein at least a portion of the concrete structure is formed over the heating panel such that the heating panel is integrally formed within the concrete structure to apply thermal energy to the exposed outer surface of the concrete structure, and wherein the concrete structure comprises a first portion positioned on a first side of the heating panel and a second portion positioned on an opposed second side of the heating panel to embed the heating panel within the concrete structure.

10. The heating system of claim 8, wherein the structure is a roof structure.

11. The heating system of claim 8, wherein the longitudinal axis of each respective carbon fiber strip is substantially parallel to the longitudinal axis of each other carbon fiber strip of the plurality of spaced carbon fiber strips.

12. The heating system of claim 11, wherein the plurality of spaced carbon fiber strips are connected in parallel to the plurality of spaced electrodes.

13. The heating system of claim 8, wherein the plurality of spaced electrodes comprises at least one pair of opposed electrodes, wherein each pair of opposed electrodes comprises a first electrode coupled to the first end of at least one spaced carbon fiber strip and a second electrode coupled to the second end of at least one spaced carbon fiber strip.

14. The heating system of claim 8, wherein the heating panel further comprises a plurality of electrical wires that are electrically coupled to the plurality of spaced electrodes and the control assembly.

15. The heating system of claim 8, wherein each electrode of the plurality of spaced electrodes has a longitudinal axis, wherein the plurality of spaced electrodes are electrically coupled to the plurality of spaced carbon fiber strips such that the longitudinal axis of each respective electrode is substantially parallel to the longitudinal axis of each other electrode of the plurality of spaced electrodes.

16. The heating system of claim 8, wherein each electrode of the plurality of spaced electrodes has a longitudinal axis, wherein the plurality of spaced electrodes are electrically coupled to the plurality of spaced carbon fiber strips such that the longitudinal axis of each respective electrode is substantially parallel to the longitudinal axis of each other electrode of the plurality of spaced electrodes, and wherein the longitudinal axes of the plurality of spaced carbon fiber strips are substantially perpendicular to the longitudinal axes of the plurality of spaced electrodes.

17. A method for heating a structure having an exposed outer surface, comprising:

forming a heating panel comprising:

a plurality of carbon fiber strips, each carbon fiber strip of the plurality of carbon fiber strips being spaced apart from adjacent carbon fiber strips within the panel and having opposed first and second ends and a longitudinal axis extending between the opposed first and second ends; and a plurality of electrodes, each electrode of the plurality of electrodes being spaced apart from other electrodes within the panel, wherein at least one electrode of the plurality of spaced electrodes is electrically coupled to each respective carbon fiber strip of the plurality of carbon fiber strips, wherein the plurality of spaced carbon fiber strips are connected to the plurality of spaced electrodes to form the heating panel, wherein the heating panel has a thickness extending along a transverse axis that is perpendicular to the longitudinal axes of the carbon fiber strips, and wherein the spaces between adjacent carbon fiber strips and the plurality of electrodes form openings that extend through the thickness of the heating panel relative to the transverse axis;

operatively coupling a control assembly to the heating panel, wherein the control assembly is configured to selectively power the heating panel;

positioning the heating panel such that the heating panel is inwardly spaced from the exposed outer surface of the structure; and selectively activating the control assembly from a remote location to power the heating panel and heat the exposed outer surface of the structure.

18. The method of claim 17, wherein the structure is a concrete structure, and wherein at least a portion of the concrete structure is formed over the heating panel such that the heating panel is integrally formed with the concrete structure.

19. The method of claim 18, wherein a first portion of the concrete structure is positioned on a first side of the heating panel and a second portion of the concrete structure is positioned on an opposed second side of the heating panel to embed the heating panel within the concrete structure.

20. The method of claim 17, wherein the structure is a roof structure.

* * * * *